United States Patent
Aggarwal

(10) Patent No.: US 8,659,604 B2
(45) Date of Patent: Feb. 25, 2014

(54) DIMENSIONAL REDUCTION MECHANISMS FOR REPRESENTING MASSIVE COMMUNICATION NETWORK GRAPHS FOR STRUCTURAL QUERIES

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 12/568,719

(22) Filed: Sep. 29, 2009

(65) Prior Publication Data

US 2011/0074786 A1 Mar. 31, 2011

(51) Int. Cl.
*G06T 11/20* (2006.01)

(52) U.S. Cl.
USPC .......................................................... 345/440

(58) Field of Classification Search
USPC ......................................................... 345/440
See application file for complete search history.

(56) References Cited

U.S. PATENT DOCUMENTS

| 7,039,251 B2 | 5/2006 | Fisher et al. | |
| 2005/0065733 A1* | 3/2005 | Caron et al. | 702/19 |

FOREIGN PATENT DOCUMENTS

| WO | WO 2009/070191 A1 | 6/2009 |
| WO | WO 2009/070841 A1 | 6/2009 |

OTHER PUBLICATIONS

Aggarwal, Charu C. et al., "XProj: A Framework for Projected Structural Clustering of XML Documents", KDD Conference, 2007, 10 pages.
Dalamagas, Theodore et al., "Clustering XML Documents using Structural Summaries", Lecture Notes in Computer Science, vol. 3268, 2005, pp. 547-556.
Faloutsos, Christos et al., "FastMap: A Fast Algorithm for Indexing, Data-Mining and Visualization of Traditional and Multimedia Datasets", SIGMOD Conference Proceedings, 1995, 26 pages.
Flake, Gary W. et al., "Graph Clustering and Minimum Cut Trees", Internet Mathematics, vol. 1, No. 4, 2003, pp. 385-408.
Gabow, Harold N., "An Efficient Reduction Technique for Degree-Constrained Subgraph and Bidirected Network Flow Problems", ACM, STOC, 1983, pp. 448-456.
Gonzalez, Jesus et al., "Efficient Mining of Graph-Based Data", AAAI Technical Report WS-00-06, 2000, http://www.aaai.org/Papers/Workshops/2000/WS-00-06/WS00-06-004.pdf, pp. 21-28.
Kanth, K. V. et al., "Dimensionality Reduction for Similarity Searching in Dynamic Databases", SIGMOD Conference, 1998, pp. 166-176.

(Continued)

*Primary Examiner* — Ryan R Yang
(74) *Attorney, Agent, or Firm* — Stephen J. Walder, Jr.; Preston J. Young

(57) ABSTRACT

Mechanisms are provided for transforming an original graph data set into a representative form having a smaller number of dimensions that the original graph data set. The mechanisms generate a graph transformation basis structure based on an input graph data structure. The mechanisms further transform an original graph data set based on an intersection of the graph transformation basis structure and the input graph data structure to thereby generate a transformed graph data set data structure. The transformed graph data set data structure has a reduced dimensionality from that of the input graph data structure but represents characteristics of the original graph data set. Moreover, the mechanisms perform an application specific operation on the transformed graph data set data structure to generate an output of a closest similarity record in the transformed graph data set to a target component.

18 Claims, 3 Drawing Sheets

(56) References Cited

OTHER PUBLICATIONS

Karger, David R., "Random Sampling in Cut, Flow, and Network Design Problems", MIT Laboratory for Computer Science, 1997, pp. 1-34.

Kashima, Hisashi et al., "Marginalized Kernels Between Labeled Graphs", ICML Conference, 2003, 8 pages.

Kernighan, B. W. et al., "An Efficient Heuristic Procedure for Partitioning Graphs", Bell System Tech. Journal, vol. 49, No. 2 Feb. 1970, pp. 291-307.

Kudo, Taku et al., "An Application of Boosting to Graph Classification", NIPS Conference, 2004, 8 pages.

Kumar, Ravi et al., "The Web as a graph", ACM PODS Conference, 2000, 10 pages.

Kuramochi, Michihiro et al., "Discovering Frequent Geometric Subgraphs", ACM, Information Systems, vol. 32, Issue 8, Dec. 2007, http://www-users.cs.umn.edu/~kuram/papers/gfsg-tr.pdf, pp. 1-17.

Ning, Huazhong et al., "Incremental Spectral Clustering With Application to Monitoring of Evolving Blog Communities", SDM Conference, 2007, 12 pages.

Papadimitriou, Christos et al., "Latent Semantic Indexing: A Probabilistic Analysis", ACM PODS Conference Proceedings, 1998, pp. 159-168.

Raghavan, Sriram et al., "Representing Web Graphs", ICDE Conference, 2003, pp. 405-416.

Rattigan, Matthew J. et al., "Graph Clustering with Network Structure Indices", ICML Conference, 2007, 8 pages.

Smalter, Aaron et al., "CPM: A Graph Pattern Matching Kernel with Diffusion for Accurate Graph Classification", Technical Report, The University of Kansas, Aug. 2008, http://www.ittc.ku.edu/publications/documents/Smalter2009_ITTC-FY2009-TR-45910-01.pdf, 11 pages.

Sun, Jimeng et al., "Less is More: Compact Matrix Decomposition for Large Sparse Graphs", SDM Conference, 2007, 12 pages.

Tong, Hanghang et al., "Colibri: Fast Mining of Large Static and Dynamic Graphs", ACM KDD Conference, 2008, 9 pages.

Wang, Junmei et al., "A Partition-Based Approach to Graph Mining", Data Engineering, ICDE '06, Proceedings of the 22nd International Conference, Apr. 3-7, 2006, http://www.comp.nus.edu.sg/~shengcha/papers/icde06_wang.pdf, 10 pages.

Yan, Xifeng et al., "Closegraph: Mining Closed Frequent Graph Patterns", ACM SIGKDD Conference, 2003, 10 pages.

Yan, Xifeng et al., "Graph Indexing Based on Discriminative Frequent Structure Analysis", ACM Transactions on Database Systems, vol. V, No. N, Aug. 2005, http://www.xifengyan.net/papers/tods05_graph.pdf, pp. 1-34.

Yan, Xifeng et al., "Mining Significant Graph Patterns by Leap Search", SIGMOD Conference, 2008, 12 pages.

Yan, Xifeng, "Mining, Indexing and Similarity Search in Large Graph Data Sets", ACM, 2006, https://www.ideals.uiuc.edu/bitstream/handle/2142/11256/Mining,%20Indexing%20and%20Similarity%20Search%%20in%20Large%20Graph%20Data%20Sets.pdf?sequence=2, 172 pages.

Zaki, Mohammed J. et al., "XRules: An Effective Structural Classifier for XML Data", SIGKDD Conference, Aug. 24-27, 2003, 10 pages.

* cited by examiner

DIMENSIONAL REDUCTION MECHANISMS FOR REPRESENTING MASSIVE COMMUNICATION NETWORK GRAPHS FOR STRUCTURAL QUERIES

BACKGROUND

The present application relates generally to an improved data processing system, apparatus, computer program product, and method, and more specifically to dimensional reduction mechanisms for representing massive communication network graphs for structural querying.

The area of graph mining has numerous applications in a number of domains including computational biology, chemical applications, the Internet, social networking, and the like. In recent years, a number of data mining and management applications have been designed in the context of graphs and structural data. Data mining is the process of extracting patterns from compilations of data. That is, data may be analyzed to identify patterns within the data and these patterns may be used as a basis for deducing some behavior of a system. Structured data mining is the process of finding and extracting useful information, e.g., patterns, from semi-structured data sets. Graph mining is a special case of structured data mining where the data sets being mined are data sets for representing information in a graph form. Detailed information about known graph mining mechanisms may be found in Cook et al., *Mining Graph Data,* 2007, available from John Wiley and Sons, Inc. publishers.

The use of graph mining is significantly limited by the ever expanding size of the data sets defining the various graphs being mined and the limited amount of available memory in most systems to store such data sets. For example, the data sets may correspond to graphs of a large communication network, social network, biological system, or the like and thus, may comprise many thousands of nodes, edges, and the like. It may not be possible to maintain all of this data in memory for use in performing graph mining.

SUMMARY

In one illustrative embodiment, a method, in a data processing system, is provided for transforming an original graph data set into a representative form having a smaller number of dimensions than that of the original graph data set. The method generates a graph transformation basis structure based on an input graph data structure. The method further transforms an original graph data set based on an intersection of the graph transformation basis structure and the input graph data structure to thereby generate a transformed graph data set data structure. The transformed graph data set data structure has a reduced dimensionality from that of the input graph data structure but represents characteristics of the original graph data set. Moreover, the method performs an application specific operation on the transformed graph data set data structure to generate an output of a closest similarity record in the transformed graph data set to a target component.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for performing dimensionality reduction on massive communication network graphs to facilitate structural queries. Dimensional reduction is the process of reducing the amount of data that is under consideration by performing feature selection and feature extraction. Feature selection is a process by which one attempts to find a subset of the original data based on predetermined criteria. Feature extraction is a process by which one applies a mapping of a multi-dimensional space into a space of fewer dimensions. Dimensional reduction is a tool used in database applications, such as indexing and retrieval, for reducing the size of the data being considered. The illustrative embodiments expand upon this use of dimensional reduction and apply it to the area of structural queries on massive graphs representing a large scale network or system.

With the illustrative embodiments, mechanisms are provided for dimensionality reduction of massive disk-resident graphs. The mechanisms of the illustrative embodiments utilize a contraction-based methodology in order to reduce the size of the underlying graphs. The reduced graph is utilized for efficient and effective indexing and retrieval, but in fact can be used for a wide variety of applications.

Figure 1:
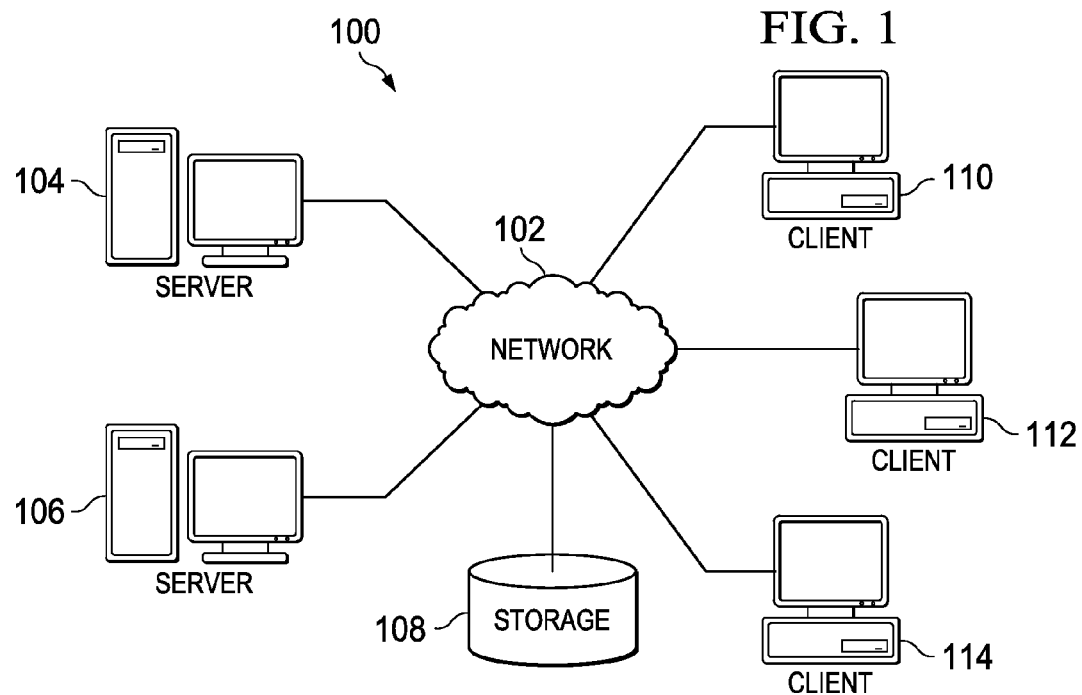
FIG. 1 is an example diagram of a distributed data processing system in which aspects of the illustrative embodiments may be implemented.
Figure 2:
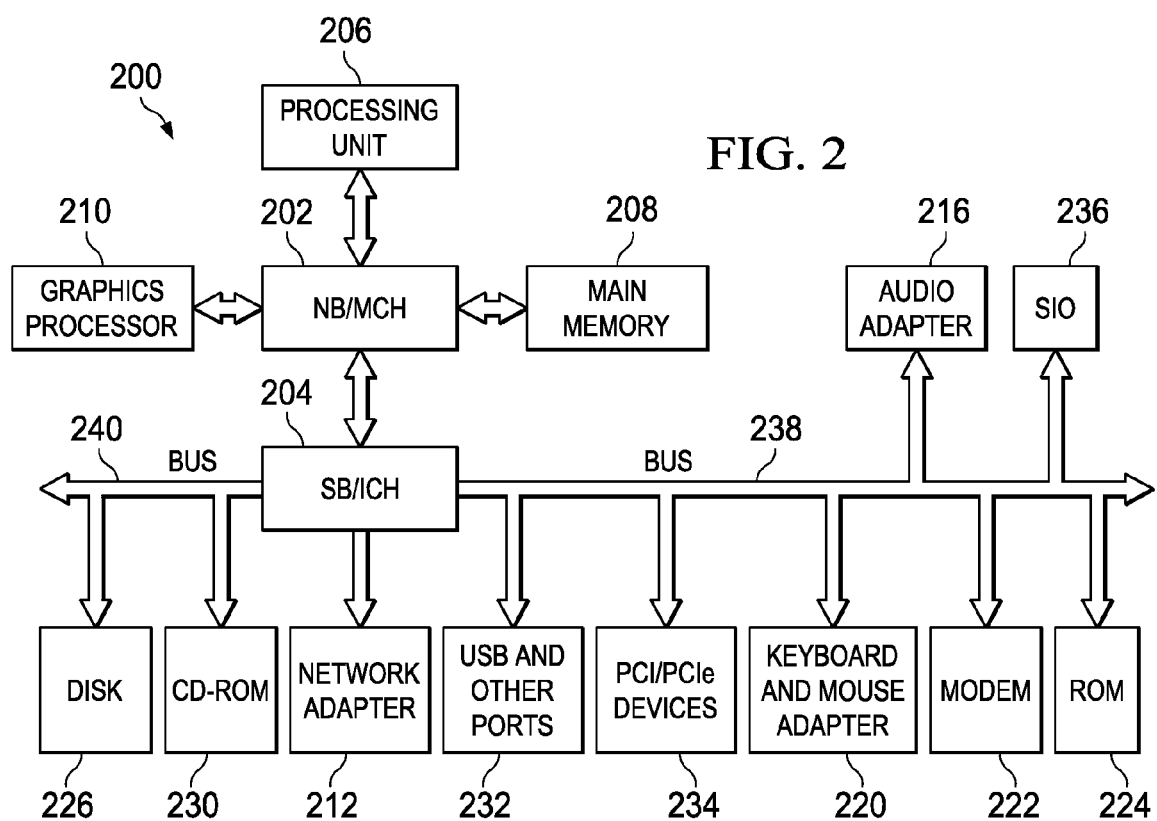
FIG. 2 is an example diagram of a computing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and other data processing environments in which massive graphs are processed for the purposes of performing structural queries.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The data processing system, (e.g., the data processing system in FIG. 1 above), apparatus or computing device (e.g., the computing device shown in FIG. 2 above), computer program product, and method of the illustrative embodiments operates to perform dimensionality reduction on massive graphs, such as those representative of communication networks, social networks, biological or chemical systems, or the like, so as to make structural queries feasible. Such massive graphs are those that have data set sizes that exceeds the size that may be accommodated by system memory and thus, the graph data sets must be maintained on more permanent storage devices, such as hard disks, tape drives, removable storage devices, or the like.

As mentioned above, the illustrative embodiments provide mechanisms for dimensional reduction of massive sized graphs that are defined by disk, or other permanent storage, resident data sets. The illustrative embodiments operate to reduce the size of these graph data sets so that they are able to be processed by applications using data stored in memories of a storage size that is typically much smaller than the storage size of the permanent storage in which the full graph data sets are stored. Thus, with the mechanisms of the illustrative embodiments, the full graph data sets may be stored in a permanent storage, such as the hard disk 226 in FIG. 2, and may be processed by the mechanisms of the illustrative embodiments which may be embodied, for example, in a program executing on processor, such as processor 206 in FIG. 2, such that the reduced graph data set may be stored in a memory of the data processing system, such as memory 208 in FIG. 2. It should be appreciated that the mechanisms of the illustrative embodiments may be distributed over a plurality of computing devices such as shown in FIG. 1. For example, the graph data sets may be stored in a network attached storage, such as storage 108 in FIG. 1, the mechanisms of the illustrative embodiments may be implemented in a server, such as server 106, and results may be provided to a client computing device, such as client 110.

Notations and Definitions

Before describing the dimensionality reduction mechanisms in detail, it is important to first define some notations and definitions. It is assumed that the data contains graphs which are denoted by $G\_1 \ldots G\_r$. The labels of the nodes in the graphs are defined over a node label set N, which is assumed to be massive, i.e. of a size typically unable to be maintained in the memory of a single computing device, e.g., having a node set of the order of a million nodes or more.

It is further assumed that the edges on the graphs $G\_1 \ldots G\_r$ are undirected, for purposes of the following description. However, it should be appreciated that the mechanisms of the illustrative embodiments may be easily generalized and applied to the case of directed graphs.

While the node label set N is assumed to be very large, or massive, each individual graph may be defined only over a subset of the node label set N. This is often the case in many real applications in which the base network may be very large, but the underlying graphs may be defined over a pattern of activity in a local region in the graph. For example, in a social network, a small set of users may interact with one another at a given time in a local region of the graph. Thus, in practical applications, such graphs satisfy the sparsity property, which is common to many application domains including that of multidimensional data. It will be shown hereafter that this sparsity property is important in a number of practical ways from the point of view of indexing the underlying data.

With the mechanisms of the illustrative embodiments, the underlying structural concepts from the graph representation are mined. A "concept," as the term is used herein, refers to a relatively small graph which represents a typical structure which is commonly found in many graphs. A "concept graph" is essentially the representation of graphs as a function of these basic structural concepts.

The underlying structural concepts create a representation which reflects the broad characteristics of a given graph in the data set with the use of a multi-dimensional format. Furthermore, this multi-dimensional representation retains the sparsity property in the sense that only a small fraction of the multi-dimensional values take on non-zero values. This ensures that it is much simpler to use a variety of sparsity-based data structures such as the inverted index in order to perform effective storage and retrieval of the data.

In accordance with the mechanisms of the illustrative embodiments, a graph transformation basis structure is defined as a set of concept graphs $H\_1 \ldots H\_j$, the edge sets of which are disjointed from one another. It is assumed that the edges in the concept graphs $H\_1 \ldots H\_j$ are weighted, and the weights correspond to the relative edge frequencies. It is further assumed that the frequency of the edge with node labels X and Y in node label set N in the concept graph $H\_j$ is given by a function $F(X, Y, H\_j)$. In the event that the edge (X, Y) does not exist in concept graph $H\_j$, it is assumed that the corresponding frequency is 0.

It is noted that this graph transformation basis structure is orthonormal when the graphs $H\_1 \ldots H\_j$ are edge-disjointed. When the concept graphs are edge-disjoint, the dot product on the corresponding edge frequencies is 0. In addition, for ease in interpretability, it is assumed that the graphs $H\_1 \ldots H\_j$ are node disjointed. This also provides a clear understanding of the different identifiers included in a particular graph transformation basis structure, and can be easily expressed in terms of a localized region of the graph. The ease in interpretability can also be useful for a number of applications in the dimensionality reduction process.

In order to define the coordinates of a graph in this graph transformation basis structure representation, let $n(G\_j)$ be the number of edges in the graph $G\_j$. Then, the coordinate $c(G\_j, H\_j)$ of the graph $G\_j$ along the concept graph $H\_j$ is defined as the sum of the corresponding edge frequencies of the concept graph along the edges included in $G\_j$. In addition, a normalization factor may be used in order to smooth the final result. This is essentially a representation of the dot product between the graph $G\_j$ and the concept graph $H\_j$. The corresponding conceptual representation is defined as follows. The conceptual representation of the graph $G\_j$ along the graph transformation basis structure $\{H\_1 \ldots H\_j\}$ is defined by the coordinate set $(c(G\_1, H\_1) \ldots c(G\_j, H\_j))$.

It should be noted that, in many real applications, the individual graph $G\_j$ may be sparse and may therefore represent only a portion of the underlying domain. In such cases, only a small fraction of the coordinates in the coordinate set $(c(G\_j, H\_1) \ldots c(G\_j, H\_j)$ take on non-zero values. Therefore, in order to improve the storage requirements for the reduced representation of a graph $G\_j$, it is possible to store the concept identifiers, i.e. the index numbers of the concepts (e.g., the identifier for the concept $H\_1$ is 1 and the identifier for concept $H\_k$ is k) together with their coordinate values. Furthermore, the interpretability of the concepts is clearer in this case than that of matrix decomposition methods since the concepts are defined in terms of a base set of concept graphs $\{H\_1 \ldots H\_j\}$.

Constructing the Graph Transformation Basis Structure

The process of constructing the graph transformation basis structure, defined above, for dimensionality reduction in accordance with the illustrative embodiments will now be described. Consider the construction of the basis structure of a data set of fixed size n containing the graphs $\{G\_1 \ldots G\_n\}$. The value of n may typically be quite large. Furthermore, the node label set size $N=|N|$ may be very large and therefore, the data may need to be stored on disk. The most important desiderata for the graph transformation basis structure are those of space-requirements and basis locality. It is desirable to retain only a small subset of representative edges from the original graph so as to optimize the space requirements for the graph transformation basis structure. While the total number of distinct edges can be as many as the square of the number of nodes, it is desirable that the space requirements for the graph transformation basis structure be significantly lower than this.

The notion of basis locality corresponds to the fact that it is desirable for each graph $G\_j$ to be described completely by as few components from the graph transformation basis structure as possible. An edge in $G\_j$ is referred to as a bridge edge if one end of the edge lies in one partition of the underlying node set N and the other end lies in a different partition of the underlying node set N. The process for generating these different partitions will be described hereafter with regard to the use of a sampling approach. An edge in $G\_j$ is also counted as bridge edge if one of the nodes at the end of the edge is not contained in any partition. This special case is specified since the sampling mechanisms of the illustrative embodiments may sometimes not pick some of the nodes in the graph.

Thus, in view of the above, it can be seen that bridge edges result from the graph $G\_j$ being defined by multiple components in the graph transformation basis structure. It is desirable to choose a graph transformation basis structure which minimizes the number of bridge edges in $G\_1 \ldots G\_n$. In order generate, the mechanisms of the illustrative embodiments create a partitioning $H\_1 \ldots H\_2 \ldots H\_m$, which minimizes the number of bridge edges in the different graphs $G\_1 \ldots G\_n$, as described hereafter.

As noted above, the massive size of the graph and the disk-resident scenario pose significant challenges. Therefore, the illustrative embodiments define and utilize a sampling-based algorithm which can be effectively implemented for a disk-resident graph, i.e. a graph data set stored on a hard disk or other permanent storage device as opposed to a memory based graph which stores the data set in main memory of the data processing system. The dimensionality reduction mechanisms of the illustrative embodiments are designed to limit the number of passes over the data set. This is particularly important in the case of structural data, i.e. graph data, since random access to edges would result in a very high disk I/O cost.

For example, let n be the number of graphs in the data set, and M be the total number of edges over all graphs. Assume that duplicates are counted distinctly. Clearly, since it is assumed that each graph must contain at least one edge, and the number of edges is at least equal to the number of nodes, then $M>=n$ and $M>=N$. The process of determining the total number of edges and creating a sample of edges requires one pass over the data. Since the graph transformation basis structure is assumed to contain m components, a contraction based sampling approach is used, as described hereafter, to determine the best graph transformation basis structure.

A straightforward contraction-based approach is often used for determining minimum 2-ways cuts of memory-resident graphs. A 2-way cut of a graph is a partitioning of the set of nodes of the graph into two groups. The set of edges that it accesses cannot be easily controlled. Thus, the contraction-based approach makes arbitrary or somewhat random accesses to disk, i.e. it accesses the edges from all over the disk, because it needs to access the edges in the graphs at different times.

Contrary to the 2-way cut contraction-based approach is not very efficient for disk based graphs, such as the massive sized graphs that are the target of the illustrative embodiments, the new contract-based approach of the mechanisms of the illustrative embodiments is designed to be able to construct a graph transformation basis structure in disk resident graphs. The mechanisms of the illustrative embodiments carefully deconstruct the contraction process into sequential phases in order to limit the number of passes over the disk-resident data. A theoretical potential function argument is then used in order to bound the number of sequential phases over the data set.

The overall approach is as follows. Let E be the union of the edges in $G\_1 \ldots G\_n$ for the nodes in nodal label set N with cardinality N. It is assumed that E is allowed to contain duplicates (or appropriately weighted edges). The mechanisms of the illustrative embodiments proceed in a number of sequential phases, each of which requires a pass over data stored on the disk or other permanent storage device. In each sequential phase, the mechanisms of the illustrative embodiments sample a set of N edges, where N is the total number of nodes in the current graph. The mechanisms of the illustrative embodiments construct the set of connected components induced by this set of N edges and contract each such connected component into a single node.

The process of contraction can create self-edges. Self-edges are those edges for which both ends are the same (contracted) node. The mechanisms of the illustrative embodiments eliminate all "self-edges" after the sequential phase of contracting the underlying connected components. The mechanisms of the illustrative embodiments, however, allow duplicate edges which are created by the contraction. It should be noted that duplicate edges result in an implicit bias in the sampling during future iterations. In some illustrative embodiments, duplicate edges can be replaced with an edge with a weight corresponding to the number of duplicates. The weight can be used in order to bias the sampling process.

After the contraction process, $N\_1<N$ nodes remain. Then, the mechanisms of the illustrative embodiments sample $N\_m$ edges and repeat the contraction approach. The mechanisms of the illustrative embodiments repeat the process until at most m connected components remain. These m connected components constitute the graph transformation basis structure upon which the further mechanisms of the illustrative embodiments operate. These further mechanisms operate on the graph transformation basis structure repeatedly k times to obtain an optimal basis that is selected from among the various possible ways in which the connected components can be created by various ways of sampling. Each sampling iteration creates one possible set of connected components from which an optimal basis is selected.

Since each graph G_j is drawn over only a modest subset of the nodes from a massive domain, and the graph transformation basis structure H_1 . . . H_m also creates a partitioning, it follows that the corresponding conceptual coordinates (c(G_j, H_m) c(G_j, H_m)) take on non-zero values (or highly positive values) on only a small fraction of the nodes. Some of the non-zero values may be created by the noise in the individual graphs. In order to create a more efficient representation, the mechanisms of the illustrative embodiments create conceptual indexing representations. That is, as mentioned above, a concept is a component of a graph and represents a dense unit of the graph. A conceptual basis is created from the multitude of components. The graphs may thus be represented as a function of this conceptual basis. This is referred to herein as a conceptual indexing representation. A noise threshold is used to determine those conceptual components which are only weakly related to a given graph. If a coordinate value is lower than the noise threshold, for example, then the coordinate value may be set to zero.

The mechanisms of the illustrative embodiments can construct an inverted representation of the graph data, in which for each possible graph transformation basis structure set of nodes, a list of graph identifiers are provided along with the corresponding conceptual coordinate values along that basis. In a given inverted list, only those graph identifiers for which the corresponding coordinate value is at least a given minimal value, i.e. the noise threshold, are included. This inverted representation can be used to resolve queries in a very efficient way since the inverted representation is very compact (because it compresses the structural information conceptually without holding information about individual graphs). Being compact makes query resolution more efficient in that the smaller amount of data needs to be accessed during processing of the query, thereby requiring less processing time.

Standard query processing techniques in information retrieval which are used with the inverted representation can also be used in this case. In order to apply standard query processing techniques from information retrieval, all the lists which have a coordinate component larger than the noise threshold are accessed. The number of such lists is determined for the data record and is used as a proxy for a measure of the data record's similarity. The most similar record is then returned. Alternatively, if desired, the approach can also be used to filter the query down to a small number of candidate graphs on which the similarity is measured explicitly. In order to explicitly determine similarity, one can filter down to a few graphs and then determine the number of common edges with the target graphs. The number of common edges is used in order to measure similarity and a final result of the most similar record is returned.

Figure 3:
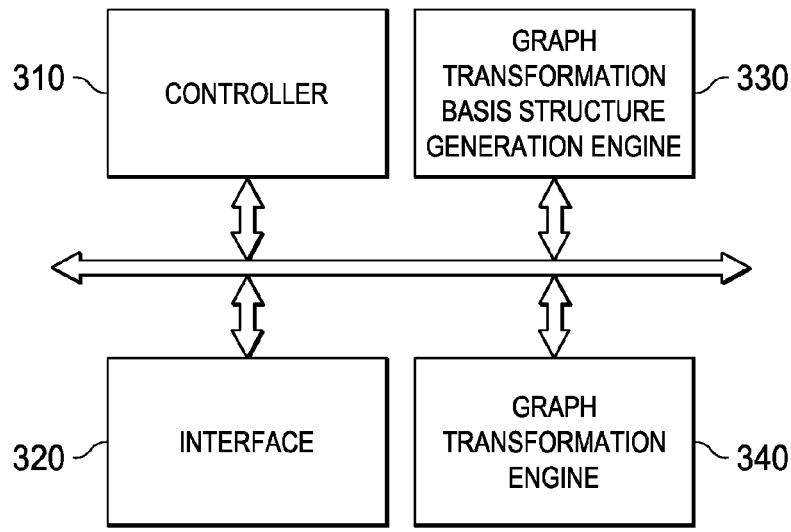
FIG. 3 is an example block diagram illustrating the main operational components and their interactions in accordance with one illustrative.

FIG. 3 is an example block diagram illustrating the main operational components and their interactions in accordance with one illustrative embodiment. The elements shown in FIG. 3 may be implemented in hardware, software, or any combination of hardware and software. In one illustrative embodiment, the elements of FIG. 3 are implemented as software executing on one or more processors of one or more data processing devices or systems.

As shown in FIG. 3, the operational components include a controller 310 that orchestrates the overall operation of the other elements 320-330. An interface 320 is provided for receiving data sets of graphs and providing results data to applications that invoke the operation of the illustrative embodiments to transform graphs into a more manageable representation and to perform searches of graph components to find components that are similar to an optimum basis structure.

A graph transformation basis structure generation engine 330 operates to generate a graph transformation basis structure based on an input graph received via the interface 320. In one illustrative embodiment, the graph transformation basis structure generation engine 330 operates to perform step 410 in FIG. 4, described hereafter. In still a further illustrative embodiment, the graph transformation basis structure generation engine 330 operates to perform the steps of FIG. 5, described hereafter, to generate a graph transformation basis structure.

A graph transformation engine 340 operates to transform graphs based on the graph transformation basis structure generated by the engine 330. In one illustrative embodiment, the graph transformation engine 340 operates to perform step 420 in FIG. 4, described hereafter. In still a further illustrative embodiment, the graph transformation engine 340 operates to perform the steps of FIG. 6, described hereafter, to transform graphs based on the graph transformation basis structure generated by the engine 330.

Figure 4:
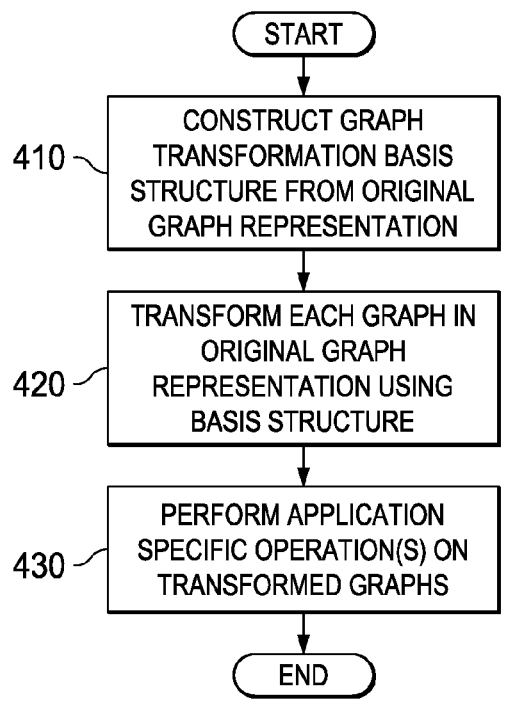
FIG. 4 is an example flowchart outlining an example process of performing an application specific operation on a transformed graph representation in accordance with one illustrative embodiment.

FIG. 4 is an example flowchart outlining an example process of performing an application specific operation on a transformed graph representation in accordance with one illustrative embodiment. As shown in FIG. 4, the operation starts with construction of the graph transformation basis structure from the original graph representation (step 410). The operations associated with constructing such a graph transformation basis structure will be described in greater detail with reference to FIG. 5 hereafter, with continued reference to the discussion of notations, definitions, and construction of the basis structure set forth previously above.

The graph transformation basis structure is used to transform each graph in the original graph representation (step 420). The operations associated with performing such transformations will be described in greater detail in FIG. 6 hereafter. These transformed graphs can be used efficiently for a variety of applications, such as a clustering application or similarity search application, for example. One or more application specific operations, from a variety of application specific operations, are performed on the transformed graphs (step 430), e.g., indexing and query processing, and the operation terminates. An example application specific technique of query processing is discussed in FIG. 7 hereafter as one example of an application specific technique that is used on the transformed graphs. Other application specific techniques may also be implemented in a normal fashion on these transformed graphs to achieve the purposes of the particular applications.

Figure 5:
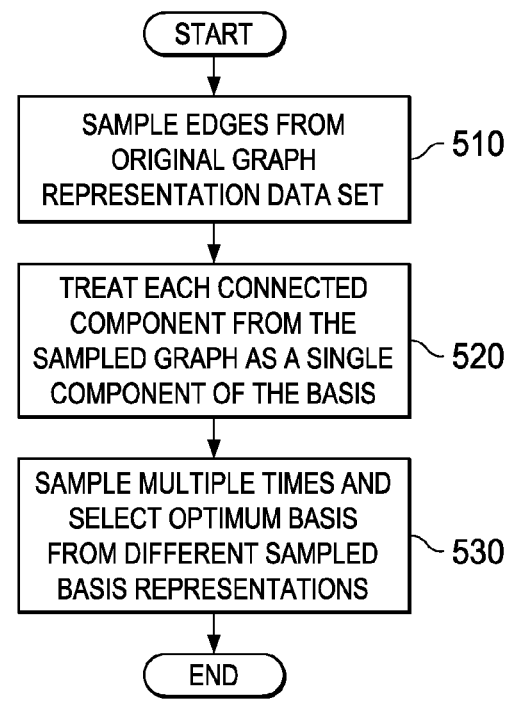
FIG. 5 is an example flowchart outlining an example process of constructing a graph transformation basis structure from data of an original graph representation in accordance with one illustrative embodiment.

FIG. 5 is an example flowchart outlining an example process of constructing a graph transformation basis structure from data of an original graph representation in accordance with one illustrative embodiment. The process outlined in FIG. 5 may be performed, for example, as part of step 410 in FIG. 4, for example.

As shown in FIG. 5, in order to construct the graph transformation basis structure, the edges from the original graph representation data set are sampled (step 510). Sampling techniques for large data sets are well known in the state of the art, any of which may be used with the mechanisms of the illustrative embodiments, and thus, a more detailed explanation is not provided herein. For example, one sampling technique that can be used with the mechanisms of the illustrative embodiments is described in Tsay et al. "Random Sampling in Cut, Flow, and Network Design Problems," Mathematics of Operations Research. 24(2): 383-413, 1999, which is hereby incorporated by reference. The connected components in the sampled basis, i.e. the set of nodes which are such that any pair of nodes is joined by a sequence of edges, are used in order to create components, on a 1 to 1 correspondence, of the sampled basis (step 520).

It should be noted that each process of sampling provides a basis structure with a particular quality, where quality is defined by the number of bridge edges, e.g., the number of edges for which the endpoints lie in two different components of the basis. Therefore, the mechanisms of the illustrative embodiments sample multiple times and pick the optimum basis from the different sampled representations (step 530). For example, a random, or pseudo-random, number generator is used for sampling, which results in a different basis each time the sampling is performed. This is because the seed of the random, or pseudo-random, number generator changes every time it is used. The optimality is determined using the above measure of quality, e.g., the total number of bridge edges. The smaller number of bridge edges, the better the result. Thus, in one illustrative embodiment, the optimum basis may be determined as the basis with the smallest number of bridge edges. The operation then terminates.

It should be appreciated that the intersection between a graph and a basis is relatively small because the number of nodes in a basis is a small fraction of the overall nodes. Therefore, the interaction between a graph and its basis is likely to be small. Thus, as a result of the mechanisms of the illustrative embodiments, a basis is selected that minimizes the size of the intersection between a graph and the optimum basis which in turn makes the resulting intersection much more manageable to process than the full graph.

Figure 6:
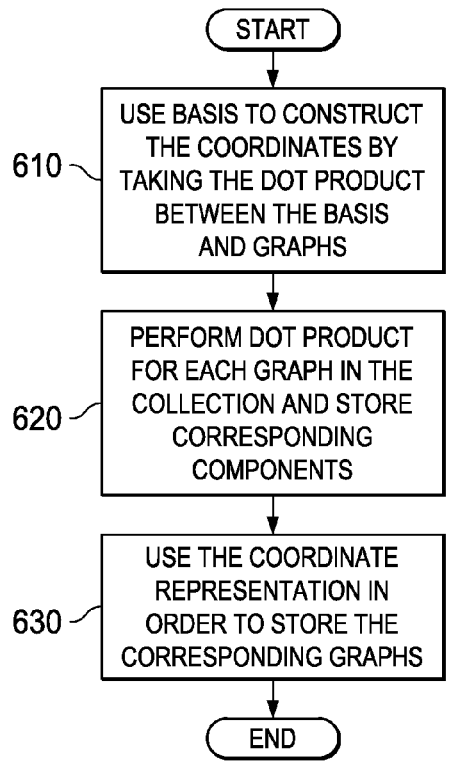
FIG. 6 is an example flowchart outlining an example process of using the graph transformation basis structure to transform one or more graphs in accordance with one illustrative embodiment.

FIG. 6 is an example flowchart outlining an example process of using the graph transformation basis structure to transform one or more graphs in accordance with one illustrative embodiment. The process outlined in FIG. 6 may be implemented, for example, as part of step 420 in FIG. 4.

As shown in FIG. 6, the process starts with the graph transformation basis structure being used to construct the coordinates of the transformed graph(s) by taking the dot product between the graph transformation basis structure and the graph(s) (step 610). For each graph transformation basis structure and graph in the data set, the dot product is performed and the corresponding coordinates are stored. Typically, for sparse graphs, i.e. graphs in which most coordinate values are zero, the intersection between the graph and the corresponding graph transformation basis structure is relatively small. This also helps in further compactness of the representation, since the coordinates can be stored in a sparse format where no storage space is allocated to coordinates with zero values, i.e. only coordinates with non-zero values are stored.

The dot product for each graph is generated and the resulting corresponding coordinates are stored (step 620). The coordinates are used to represent the corresponding graphs (step 630). These graph representations can then be used for a variety of mining purposes. An important observation is that these representations are extremely compact and can therefore be used effectively and efficiently over a variety of applications. The compactness comes from the structural data being represented as a set of coordinates. Prior to the present invention, there have been no known mechanism for converting structural data into coordinate based data.

Figure 7:
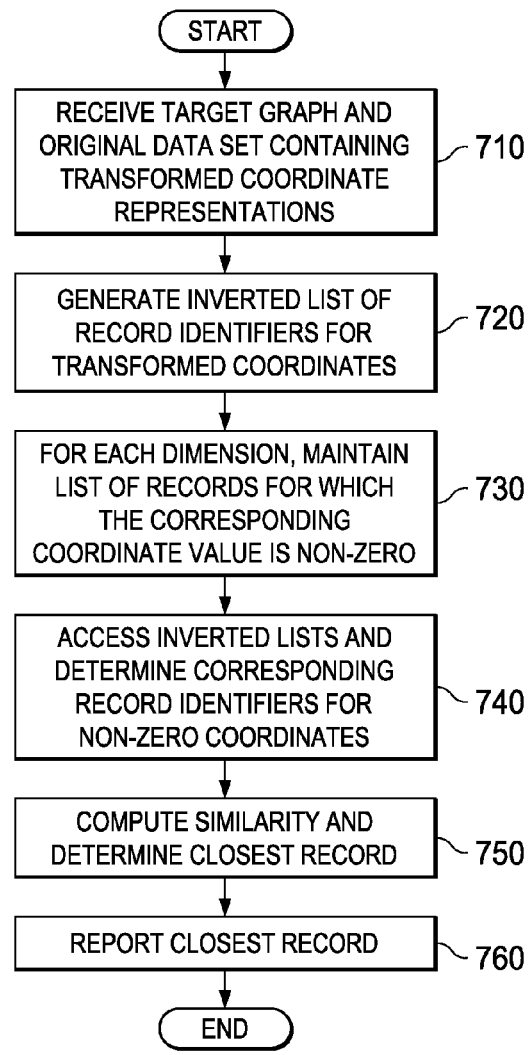
FIG. 7 is an example flowchart outlining an example process of using the transformed graph representation in an application-specific manner in accordance with one illustrative embodiment.

FIG. 7 is an example flowchart outlining an example process of using the transformed graph representation in an application-specific manner in accordance with one illustrative embodiment. The operation outlined in FIG. 7 may be part of step 430 in FIG. 4, for example. It should be noted that the operation outlined in FIG. 7 can generally be used for many applications, though in the depicted example it is being specifically used for query processing and indexing.

As shown in FIG. 7, the input to the application is a target graph and original data set containing the transformed coordinate representations of the graphs (step 710). It is desirable to determine the closest graph to the target with the use of these transformed coordinate representations. An inverted list of record identifiers for the transformed coordinate representations of the data set is generated (step 720). Note that this inverted list needs to be created only once over the entire set of queries and does not need to be recreated. For each dimension, a list of the records for which the corresponding coordinate value for the graph is non-zero is maintained (step 730). Since the data is sparse, this implies that each inverted list is relatively small compared to the data set. For each non-zero coordinate in the conceptual representation, the inverted lists are accessed and the corresponding record identifiers are determined (step 740). The similarity is computed with respect to these record identifiers, and the closest record is determined (step 750). This closest record is reported (step 760).

The above mechanisms of the illustrative embodiments may be used in a variety of different applications. For example, the mechanisms of the illustrative embodiments may be used to determine similar network structures to a given sample structure. As a further example, with regard to chemical and biological compounds, one can represent these as networks of atoms or smaller units, and one may wish to determine similar compounds to a particular structure. Such an approach can be useful in many applications, such as drug discovery, or the like. Thus, dependent upon the particular application, the outputting, or reporting, of the closest record may be simply outputting the closest record for viewing by a user, may be providing the closest record to the particular computer application or program that requested the similarity search in the first place, or the like.

Thus, the illustrative embodiments provide mechanisms for dimensionality reduction of massive disk-resident graphs. The reduction is specifically designed to be easily compatible to various data mining application operations that are to be performed on graphs, such as indexing and query processing. The mechanisms of the illustrative embodiments utilize a contraction-based methodology in order to reduce the size of the underlying graphs. The reduced graph is utilized for efficient and effective indexing and retrieval. However, the techniques of the illustrative embodiments are not limited to indexing and can in fact be used for a wide variety of applications.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for transforming an original graph data set into a representative form having a smaller number of dimensions than that of the original graph data set, comprising:
   generating, in a processor of the data processing system, a graph transformation basis structure based on an input graph data structure;
   transforming, by the processor, an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
   performing, by the processor or a different processor of the data processing system, an application specific operation on the transformed graph data set data structure to generate an output of a closest similarity record in the transformed graph data set to a target component, wherein the graph transformation basis structure is a set of concept graphs having disjointed edge sets from one another, and wherein individual graphs within the graph transformation basis structure have coordinates along a concept graph in the set of concept graphs defined by a sum of corresponding edge frequencies of the concept graph along an edge of the individual graph.

2. The method of claim 1, wherein the input graph data structure has a size that exceeds an available storage capacity of a system memory of the data processing system.

3. The method of claim 1, wherein the input graph data structure comprises data sets for a plurality of graphs.

4. The method of claim 1, wherein transforming an original graph data set based on an intersection of the graph transformation basis structure and the input graph data set to thereby generate a transformed graph data set data structure comprises:
   performing, for each graph in the input graph data structure, a dot product operation on the graph transformation basis structure and the graph of the input graph data structure to generate a coordinate representation of the graph; and
   storing the resulting coordinate representation of the graphs of the input graph data structure.

5. The method of claim 1, wherein performing an application specific operation on the transformed graph data set data structure comprises:
   receiving the target component;
   generating an inverted list of record identifiers for transformed coordinates in the transformed graph data set data structure;
   generating, for each dimension of the transformed graph data set data structure, a list of records for which a corresponding coordinate value, in the transformed graph data set data structure, is non-zero;
   computing a similarity of the target component to records in the list of records for each of the dimensions of the transformed graph data set data structure; and
   reporting a closest record based on the similarity of the target component to the records in the lists of records.

6. A method, in a data processing system, for transforming an original graph data set into a representative form having a smaller number of dimensions than that of the original graph data set, comprising:
   generating, in a processor of the data processing system, a graph transformation basis structure based on an input graph data structure;
   transforming, by the processor, an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
   performing, by the processor or a different processor of the data processing system, an application specific operation on the transformed graph data set data structure to generate an output of a closest similarity record in the transformed graph data set to a target component, wherein generating a graph transformation basis structure based on an input graph data structure comprises:
   sampling edges from the input graph data structure;
   generating components of a basis structure based on components in the input graph data structure connected by the sampled edges;
   repeating the sampling and generating operations to generate a plurality of basis structures; and
   selecting a basis structure from the plurality of basis structures to be used as the graph transformation basis structure.

7. The method of claim 6, wherein each basis structure in the plurality of basis structures is different from other basis structures in the plurality of basis structures.

8. A computer program product comprising a non-transitory computer readable medium having a computer readable program recorded thereon, wherein the computer readable program, when executed on a computing device, causes the computing device to:
   generate a graph transformation basis structure based on an input graph data structure;
   transform an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
   perform an application specific operation on the transformed graph data set data structure to generate an output of a closest similarity record in the transformed graph data set to a target component, wherein the graph transformation basis structure is a set of concept graphs having disjointed edge sets from one another, and wherein individual graphs within the graph transformation basis structure have coordinates along a concept graph in the set of concept graphs defined by a sum of corresponding edge frequencies of the concept graph along an edge of the individual graph.

9. The computer program product of claim 8, wherein the input graph data structure has a size that exceeds an available storage capacity of a system memory of the data processing system.

10. The computer program product of claim 8, wherein the input graph data structure comprises data sets for a plurality of graphs.

11. The computer program product of claim 8, wherein the computer readable program causes the computing device to transform an original graph data set based on an intersection of the graph transformation basis structure and the input graph data set to thereby generate a transformed graph data set data structure by:
   performing, for each graph in the input graph data structure, a dot product operation on the graph transformation basis structure and the graph of the input graph data structure to generate a coordinate representation of the graph; and
   storing the resulting coordinate representation of the graphs of the input graph data structure.

12. The computer program product of claim 8, wherein the computer readable program causes the computing device to perform an application specific operation on the transformed graph data set data structure by:
   receiving the target component;
   generating an inverted list of record identifiers for transformed coordinates in the transformed graph data set data structure;
   generating, for each dimension of the transformed graph data set data structure, a list of records for which a corresponding coordinate value, in the transformed graph data set data structure, is non-zero;
   computing a similarity of the target component to records in the list of records for each of the dimensions of the transformed graph data set data structure; and
   reporting a closest record based on the similarity of the target component to the records in the lists of records.

13. A computer program product comprising a non-transitory computer readable medium having a computer readable program recorded thereon, wherein the computer readable program, when executed on a computing device, causes the computing device to:
   generate a graph transformation basis structure based on an input graph data structure;
   transform an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
   perform an application specific operation on the transformed graph data set data structure to generate an output of a closest similarity record in the transformed graph data set to a target component, wherein the computer readable program causes the computing device to generate a graph transformation basis structure based on an input graph data structure by:
   sampling edges from the input graph data structure;
   generating components of a basis structure based on components in the input graph data structure connected by the sampled edges;
   repeating the sampling and generating operations to generate a plurality of basis structures; and
   selecting a basis structure from the plurality of basis structures to be used as the graph transformation basis structure.

14. The computer program product of claim 13, wherein each basis structure in the plurality of basis structures is different from other basis structures in the plurality of basis structures.

15. An apparatus, comprising:
   a processor; and
   a memory coupled to the processor, wherein the memory comprises instructions which, when executed by the processor, cause the processor to:
   generate a graph transformation basis structure based on an input graph data structure;
   transform an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
   perform an application specific operation on the transformed graph data set data structure to generate an output of a closest similarity record in the transformed graph data set to a target component, wherein the graph transformation basis structure is a set of concept graphs having disjointed edge sets from one another, and wherein individual graphs within the graph transformation basis structure have coordinates along a concept graph in the set of concept graphs defined by a sum of corresponding edge frequencies of the concept graph along an edge of the individual graph.

16. The apparatus of claim 15, wherein the instructions cause the processor to transform an original graph data set based on an intersection of the graph transformation basis structure and the input graph data set to thereby generate a transformed graph data set data structure by:
   performing, for each graph in the input graph data structure, a dot product operation on the graph transformation basis structure and the graph of the input graph data structure to generate a coordinate representation of the graph; and
   storing the resulting coordinate representation of the graphs of the input graph data structure.

17. The apparatus of claim 15, wherein the instructions cause the processor to perform an application specific operation on the transformed graph data set data structure by:
   receiving the target component;
   generating an inverted list of record identifiers for transformed coordinates in the transformed graph data set data structure;
   generating, for each dimension of the transformed graph data set data structure, a list of records for which a corresponding coordinate value, in the transformed graph data set data structure, is non-zero;
   computing a similarity of the target component to records in the list of records for each of the dimensions of the transformed graph data set data structure; and
   reporting a closest record based on the similarity of the target component to the records in the lists of records.

18. An apparatus, comprising:
a processor; and
a memory coupled to the processor, wherein the memory comprises instructions which, when executed by the processor, cause the processor to:
generate a graph transformation basis structure based on an input graph data structure;
transform an original graph data set based on an intersection of the graph transformation basis structure and the input graph data structure to thereby generate a transformed graph data set data structure, wherein the transformed graph data set data structure has a reduced dimensionality from that of the input graph data structure but represents characteristics of the original graph data set; and
perform an application specific operation on the transformed graph data set data structure to generate an output of a closest similarity record in the transformed graph data set to a target component, wherein the instructions cause the processor to generate a graph transformation basis structure based on an input graph data structure by:
sampling edges from the input graph data structure;
generating components of a basis structure based on components in the input graph data structure connected by the sampled edges;
repeating the sampling and generating operations to generate a plurality of basis structures; and
selecting a basis structure from the plurality of basis structures to be used as the graph transformation basis structure.

* * * * *